May 29, 1962 A. F. MILLINGTON ETAL 3,036,679
MAGNETIC CLUTCH STRUCTURE
Filed Jan. 17, 1958 2 Sheets-Sheet 2

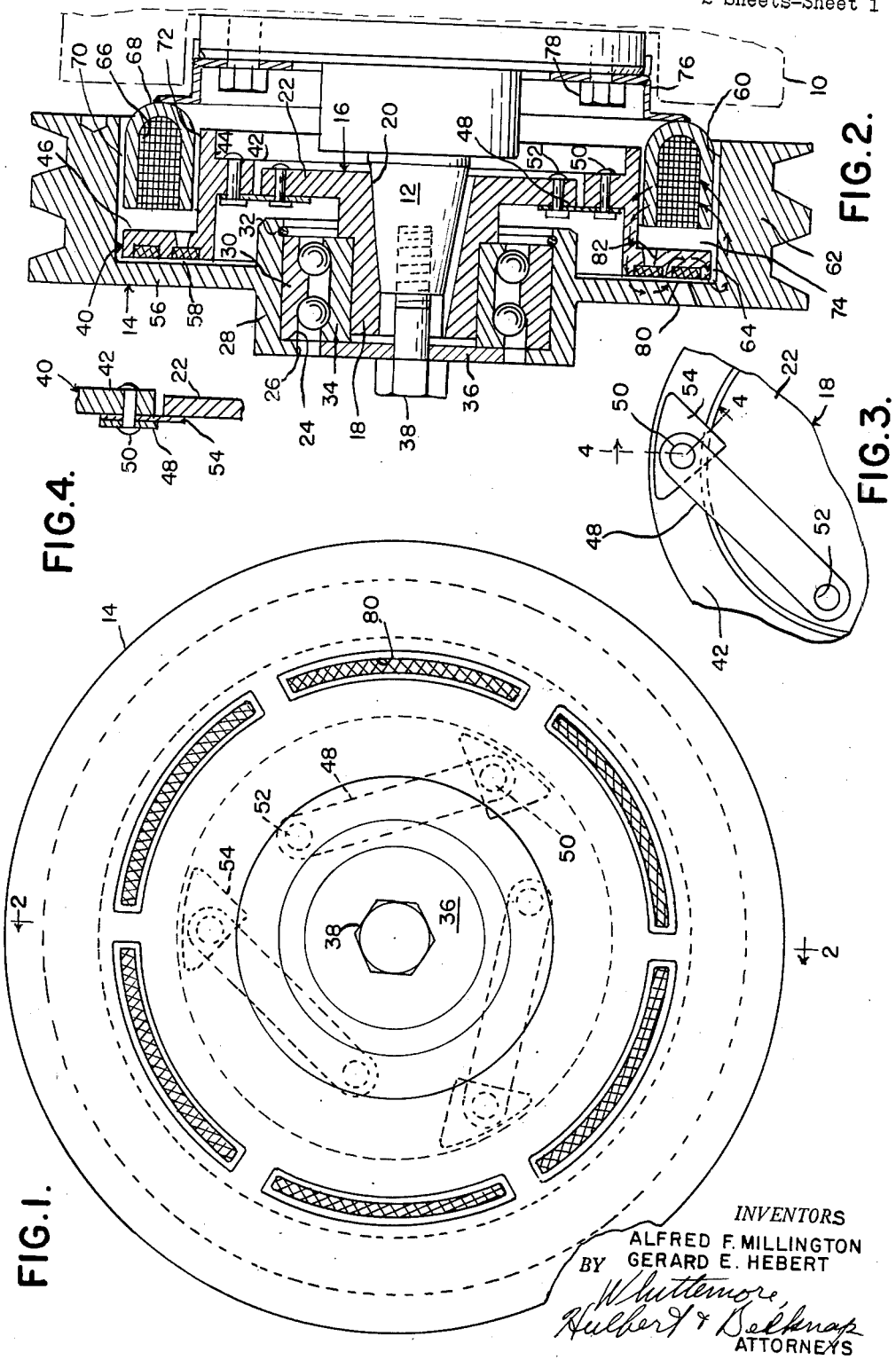

INVENTORS
ALFRED F. MILLINGTON
GERARD E. HEBERT
BY
ATTORNEYS

United States Patent Office 3,036,679
Patented May 29, 1962

3,036,679
MAGNETIC CLUTCH STRUCTURE
Alfred F. Millington, Northville, and Gerard E. Hebert, Livonia, Mich., assignors to Novi Equipment Company, Novi, Mich., a corporation of Michigan
Filed Jan. 17, 1958, Ser. No. 709,502
6 Claims. (Cl. 192—84)

The present invention relates to a magnetic clutch structure.

It is an object of the present invention to provide a magnetic clutch including concentric rotatable driving and driven members, a movable clutch plate carried by one of said members for moving axially thereof into engagement with the other of said members while preserving torque transmitting relation therewith, and field windings for establishing a magnetic flux which links said clutch plate and the adjacent portion of said other member.

More specifically, it is an object of the present invention to provide a structure as described in the preceding paragraph in which the field windings are stationary.

It is a further object of the present invention to provide magnetic clutch structure including a shaft, a coupling member connected to said shaft, an annular clutch plate movably connected to said coupling member in torque transmitting relation, a driving member carried for rotation by said coupling member and having a clutch portion in close axially spaced relation to said clutch plate.

It is a further object of the present invention to provide structure as described in the preceding paragraph in which said driving member includes a rim portion forming with said clutch plate an annular housing, and in which the field winding is stationary and is located in said annular housing.

It is a further object of the present invention to provide in a magnetic clutch, an annular member having a radially outwardly extending flange, a clutch plate having a radially inwardly extending flange, elongated leaf springs having opposite ends connected to said flanges and adapted to provide for axial movement between said annular member and clutch plate and to transmit torque therebetween.

It is a further object of the present invention to provide a magnetic friction device such as a brake or clutch comprising pole pieces adapted to be brought into pressure contact by magnetic attraction in which the efficiency is increased by reducing the path for magnetic flux substantially at the faces of the pole pieces.

Other objects and features of the invention will become apparent as the description proceeds, especially when taken in conjunction with the accompanying drawings, illustrating preferred embodiments of the invention, wherein:

FIGURE 1 is an elevational view of drive structure including the magnetic clutch.

FIGURE 2 is a sectional view on the line 2—2 FIGURE 1, with some elements circumferentially displaced for clarity.

FIGURE 3 is a fragmentary elevational view of the torque transmitting resilient connection to the clutch plate.

FIGURE 4 is a fragmentary section on the line 4—4, FIGURE 3.

Figures 5, 6:
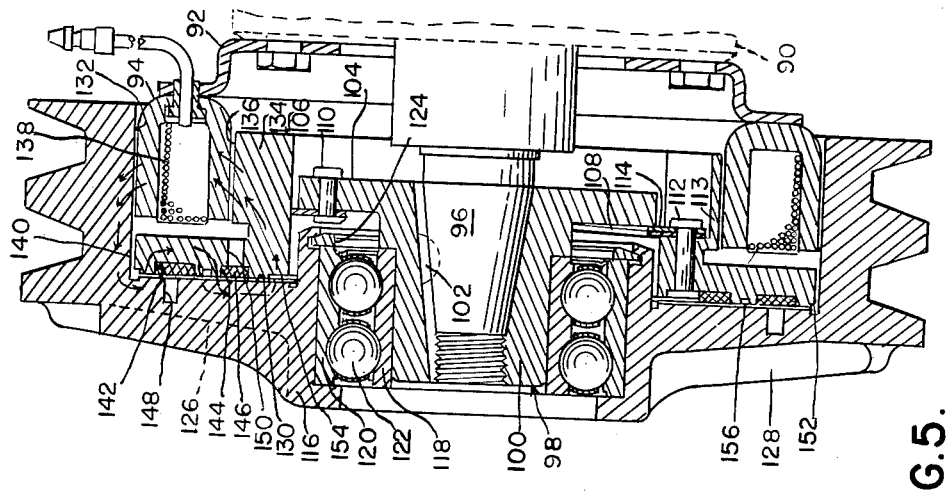
FIGURE 5 is a sectional view through a clutch representing a different embodiment of the present invention.
FIGURE 6 is a front elevational view of the movable pole piece or clutch plate.

The present invention is capable of many different applications but is illustrated herein as applied to a compressor 10, in FIGURE 2, for an automobile air conditioning system. The compressor includes a tapered drive shaft 12 which is adapted to be selectively driven from a pulley 14 which may be driven by a driving pulley connected to the drive shaft of the automobile.

Connected to the tapered end of the compressor shaft 12 is an annular coupling member indicated generally at 16 having a hub 18 provided with an axially extending tapered opening 20 which receives the tapered end portion of the compressor shaft 12. The coupling member 16 includes a radially outwardly extending annular flange 22.

The pulley 14 is mounted for rotation on the hub 18 of the coupling member and for this purpose a ball bearing indicated generally at 24 is provided on the outside of the hub 18 and is received within a radially inwardly extending flange portion 26 provided on an axially extending cylindrical portion 28 at the inner edge of the pulley. The outer race 30 of the ball bearing is retained in position by a snap ring 32. The inner race 34 of the ball bearing engages a washer 36 which is urged inwardly by a screw 38 extending into a threaded opening at the end of the tapered compressor shaft 12. From the foregoing it will be seen that the screw 38 urges the assembly including the coupling member 18 firmly on the taper of the compressor shaft.

At the outer edge of the flange 22 of the coupling member 16 is provided a clutch plate indicated generally at 40 which includes a radially inwardly extending flange 42, an axially extending cylindrical portion 44, and the radially outwardly extending clutch portion 46 which will be described subsequently in more detail.

Connecting the radially outwardly extending flange 22 of the coupling member 16 to the radially inwardly extending flange 42 of the clutch plate 40 are a plurality of elongated leaf springs 48 having their outer ends connected as by rivets 50 to the radially inwardly extending flange 42, and by rivets 52 to the radially outwardly extending flange 22 of the coupling member 16.

As best seen in FIGURES 1 and 3, the elongated leaf springs 48 are disposed to extend substantially tangentially with respect to the periphery of the outwardly extending flange 22.

The elongated leaf springs 48 have the flat portions thereof occupying a plane perpendicular to the axis of the shaft 12 and hence, they are adapted to flex readily to permit limited axial displacement of the clutch plate 40 relative to the coupling member 16. At the same time, the leaf springs are adapted to transmit substantial torque between the coupling member and the clutch plate. It will be appreciated that in order to transmit the maximum torque, the leaf springs 48 will be arranged so that they are subjected to tension in transmitting torque from the pulley 14 to the coupling member 16.

As best seen in FIGURES 3 and 4, the rivets 50 are also disposed to support flat abutment plates 54 which overlie the flange 22 and thus limit movement of the clutch plate 40 to the right as seen in FIGURE 2. Due to the presence of the flat abutment plates 54, springs 48 are always slightly bent and retain the abutment plates under light pressure against the flat surface of flange 42.

Referring now to FIGURE 2, it will be observed that clutch portion 46 of the clutch plate is separated from an adjacent annular web portion 56 of the pulley by a relatively small air gap as indicated at 58. The surface of the clutch portion 46 is provided with circular recesses for receiving a friction material such for example as asbestos or the like, adapted to provide frictional driving engagement between the clutch plate and the pulley. It will also be observed that the radially outward edge of the clutch portion 46 of the clutch plate is closely spaced to the inner surface 60 of the rim portion 62 to provide a small air gap as indicated at 64.

Located within an annular chamber defined between the surface 60 of the pulley and the outer surface of the cylindrical portion 44 of the clutch plate is a field winding 66 received within a field coil housing 68. The field coil housing 68 is arranged to have relatively small air gaps 70 and 72 to the inner surface 60 of the pulley and the outer surface of the cylindrical portion 44 of the clutch plate.

The field coil housing 68, the clutch plate and at least the clutch portion 56 of the pulley 14 are formed of magnetic material. Attention is particularly drawn to the relatively great air gap indicated at 74 between the end of the coil housing 68 and the adjacent surface of the clutch portion 46 of the clutch plate for a purpose which will presently appear.

The field coil housing 68 is rigidly supported by an annular bracket 76 bolted to an end of the compressor as indicated at 78. The field coil housing 68 is thus maintained stationary and there is no problem of providing brushes or the like to complete an electric circuit therethrough.

Due to the relative dimensions of the air gaps separating the field coil housing 68 from the pulley 14 and the cylindrical portion 44 of the clutch plate, the lines of magnetic flux pass from the field coil housing to the pulley 14 and the clutch portion 46 of the clutch plate 40. However, means are provided to insure that the flux traverses the air gap between the clutch portion 46 and the adjacent annular portion 56 of the pulley a plurality of times so as to increase the force pressing the clutch plate against the pulley. This means comprises the arcuate openings 80 which are provided in the portion 56 of the pulley and similar arcuate openings 82 formed in the clutch portion 46 of the clutch plate. As a result of this arrangement the closed path which the flux defines from the coil housing 68 is illustrated by the small broken arrows at the bottom of FIGURE 2.

The use of the elongated leaf springs provides a very simple connection between the coupling member 16 and the clutch plate 40 which permits movement under relatively small forces of the clutch plate axially into engagement with the annular clutch portion 56 of the pulley, while at the same time providing relatively powerful means for transmitting torque between the members. It is also important to provide for initial movement of the clutch portion 46 into engagement with the clutch portion 56 of the pulley so that the air gap at 58 is maintained at a small dimension with considerable accuracy. This is accomplished by the provision of the abutments 54 which prevent movement of the clutch portion 46 of the clutch plate away from the clutch portion 56.

As best seen in FIGURES 3 and 4, each flat abutment plate 54 is positioned between the end of each flat leaf spring 48 and the flat surface of the flange 42 of the clutch plate. The other end of each leaf spring 48 is connected flat against the flat surface of the radially extending flange 22 of the coupling member 16. Accordingly, the abutment prevents the leaf springs from becoming straight, and the clutch member is thus held against axial movement with light spring pressure when the clutch is disengaged.

Referring now to FIGURES 5 and 6 there is illustrated a second embodiment of the present invention which incorporates some improved features. In this embodiment of the invention a portion of the compressor is indicated in dotted lines at 90 to which is connected a rigid annular bracket 92 carrying the field coil housing 94 in rigidly fixed location. Extending from the compressor is the end of a drive shaft 96 to which is secured a coupling member 98 having a hub portion 100 keyed as indicated at 102 to the compressor shaft and having a radially outwardly extending flange portion 104. Connected to the flange 104 is a clutch plate indicated generally at 106, the connection being by elongated leaf springs 108 corresponding to the leaf springs 48 illustrated in the first embodiment of the invention. The inner ends of the leaf springs are connected to the flange by rivets 110 and the outer ends of the leaf springs are connected to the clutch plate 106 by the rivets 112 which also carry stop elements 114 effective to limit axial movement of the clutch plate 106 away from its position of clutching engagement. It will be observed that the interposition of the stop elements 114 causes the leaf springs 108 to remain slightly bowed so that in the unclutched position there is a slight spring tension holding the stop elements 114 against the surface of the flange 104. This has the effect of preventing vibration and causing silent operation.

Driving means herein illustrated as a pulley 116 is provided connected by a ball bearing to the hub portion of the connector 98. The inner race 118 of the ball bearing is pressed to a reduction portion of the hub 100 and the outer race 120 is provided with a press fit into a recess at the inner side of the pulley 116. Balls 122 are provided intermediate the races and a snap ring 124 may be provided to lock the outer race 120 in position.

The pulley 116 includes a clutching web portion 126 reinforced by generally radially extending but preferably slightly circumferentially inclined ribs 128, the inner surface of the web portion, as indicated at 130, being a flat radially disposed clutching surface. The rim of the pulley 116 extends axially and has an inner cylindrical surface 132 spaced with minimum clearance from the outer surface of the field coil housing 94. It may be mentioned at this time that the clutch plate 106 includes a generally cylindrical portion 134 of substantial cross-section to provide a good path for magnetic flux, the inner surface of which as indicated at 136 is spaced with minimum clearance with respect to the inner surface of the field coil housing 94. The field coil windings are indicated at 138.

The clutch plate 106 includes a radially extending clutch portion 140 having a flat surface disposed in a radial plane which is modified as will now be described. The operating surface of the clutch portion 140 includes relatively deep annular recesses 142 and 144 adapted to receive a friction material indicated at 146 such for example as an asbestos brake compound. Upon initial production of the clutch plate, the friction material 146 is provided so that it does not extend beyond the surface of the clutching portion 140. In fact, to insure that it does not extend beyond the clutching surface, it is preferably recessed slightly below the surface so that it does not come into frictional engagement with the clutch surface 130 of the pulley until the parts are worn in.

In order to provide a specific path for magnetic flux which interlinks the clutch portions of the pulley and the clutch plate, a continuous annular groove or recess 148 is provided in the active surface of the clutch portion of the pulley. In the flange or clutch portion 140 of the clutch plate, elongated circumferentially extending openings 150 are provided. As a result of the relatively deep groove or recess 148 and the elongated circumferentially extending openings 150, the magnetic flux resulting from the passage of current through the windings of the field coil 138 is positioned to follow a path represented by the short arrows at the top of FIGURE 5. The flux is forced to follow this path due to the spacing between the field coil housing 94, the adjacent portions of the pulley 116, and the clutch plate 106. It will be observed that the magnetic flux links the clutch surfaces of the pulley and clutch plate at three distinct annular zones.

A very important feature of the present invention is the further modification of the clutch surface of the clutch plate 106 as illustrated in FIGURES 5 and 6. It will be observed that the clutch surface of the clutch plate is modified by shallow relief at its outer periphery as indicated at 152 and at its inner periphery as indicated at 154, and further, intermediate the inner and outer edges thereof as indicated at 156. This relief is relatively shallow as for example about ten to fifteen thousandths. It has the effect of restricting the cross-sectional area of the path for magnetic flux directly at a pole face which increases the magnetic attraction between the pole faces as a result of the fact that the magnetic attraction varies substantially as the square of the flux density. At the same time, the relief areas are kept as shallow as possible in order to introduce a minimum additional reluctance to the flux path. In a specific case, excellent results were obtained when the active area of the pole face was reduced approximately one-third by the provision of the shallow relief. It is believed that a reduction of pole face area by an amount between one-quarter and one-half is most desirable.

While the present disclosure includes a pulley it will of course be apparent that other driving means such for example as a gear could be substituted therefor.

While the detailed disclosure herein relates to a clutch, it will of course be apparent that certain aspects of the present invention are applicable to other magnetically actuated devices such for example as a magnetic brake.

The drawings and the foregoing specification constitute a description of the improved magnetic clutch structure in such full, clear, concise and exact terms as to enable any person skilled in the art to practice the invention, the scope of which is indicated by the appended claims.

What we claim as our invention is:

1. A magnetic clutch comprising a stationary support, an inner rotary member carried thereby, a clutch member, means connecting said clutch member to said rotary member for limited axial movement relative thereto and for transmission of torque therebetween, said clutch member having an axially extending tubular portion surrounding said rotary member and provided with a cylindrical outer surface and a generally flat annular portion extending radially outwardly from the axially outer end of said tubular portion and having a flat annular axially outer clutch surface, an outer rotary member having a tubular portion provided with a cylindrical inner surface and having a radially extending portion provided with a flat radially inwardly extending inner clutch surface engageable by the flat clutch surface of said clutch member upon axially outward movement thereof, an electromagnet coil, an annular magnet housing of U-shaped cross-section carried by said stationary support having an outer cylindrical surface closely spaced from the inner cylindrical surface of said outer rotary member to provide a relatively low reluctance magnetic flux path therebetween and an inner cylindrical surface closely spaced from the outer cylindrical surface of said clutch member to provide a relatively low reluctance magnetic flux path therebetween and axially outer end walls spaced substantially from the axially inner surface of the radially outwardly extending portion of said clutch member, the radially outer edge of said radially outwardly extending portion of said clutch member being spaced substantially from the inner cylindrical surface of said outer rotary member to provide a relatively high reluctance magnetic flux path therebetween, the said clutch surfaces of said clutch member and outer rotary member being relatively movable between engaged operating position and closely spaced inoperative position whereby all flux established by said coil links said clutch surfaces and establishes magnetic attraction forces urging said clutch member axially outwardly away from said coil and housing.

2. A clutch construction as defined in claim 1 in which the clutch surface of said clutch member is provided with recesses, friction material in said recesses for providing frictional driving engagement between the clutch surfaces, the friction material initially being provided slightly below the clutch surface of said clutch member so as to require some wear of the clutch surface of said clutch member before the friction material can contact the clutch surface of the outer rotary member.

3. A clutch comprising a stationary support, a rotary shaft, a first rotary member fixed to said shaft and having a first flat radially extending surface, an annular clutch member surrounding said rotary member and having a second flat radially extending surface adjacent said first surface, a second rotary member, means mounting said second rotary member for rotation about the axis of said shaft, said clutch member and said second rotary member having generally radially extending clutch surfaces, means connecting said clutch member to said first rotary member for rotation therewith and for limited movement relative thereto axially of said shaft to effect engagement and disengagement between said clutch surfaces, said means comprising normally flat leaf springs, means connecting the end portions of each of said springs to said first rotary member and said clutch member in circumferentially angularly spaced relation and with the end portions of the springs parallel to said radially extending surfaces thereof, abutment means acting between said first rotary member and said clutch member and engageable upon movement of said clutch member away from the clutch surface of said second rotary member to prevent the end portions of said leaf springs from occupying the same plane so that said leaf springs are bent in a direction tending to produce further movement of said clutch member away from the clutch surface of said second rotary member, and electro-magnetic means effective when energized to move said clutch member toward the clutch surface of said second rotary member.

4. A clutch as defined in claim 3 in which said flat radially extending surfaces face in the same direction, and in which said abutment means comprises a flat abutment plate secured to the flat radially extending surface of one of the members to which said leaf springs are secured between and in parallelism to the end portion of a leaf spring connected to said one member and said flat radially extending surface.

5. A clutch as defined in claim 3 in which said flat radially extending surfaces face in the opposite direction, and in which said abutment means comprises a flat abutment plate secured in parallel relation between the radially outer flat surface and the end of one of said leaf springs in a position to engage the flat radially extending surface of the member to which the other end of said leaf spring is secured.

6. A clutch comprising a stationary support, a rotary shaft, a first rotary member fixed to said shaft and having a first flat radially extending surface, an annular clutch member surrounding said rotary member and having a second flat radially extending surface adjacent said first surface, a second rotary member, means mounting said second rotary member for rotation about the axis of said shaft, said clutch member and said second rotary member having generally radially extending clutch surfaces, means connecting said clutch member to said first rotary member for rotation therewith and for limited movement relative thereto axially of said shaft to effect engagement and disengagement between said clutch surfaces, said means comprising normally flat leaf springs, means connecting the end portions of each of said springs to said first rotary member and said clutch member in circumferentially angularly spaced relation and with the end portions of the springs parallel to said radially extending surfaces thereof, recesses in the clutch surface of said clutch member, friction material in said recesses for providing frictional driving engagement between the clutch surfaces, the friction material initially being provided slightly below the clutch surface of said clutch member so as to require some wear of the clutch surface of said clutch member before the friction material can contact the clutch surface of the second rotary member, and electro-magnetic means effective when energized to move said clutch member toward the clutch surface of said second rotary member.

References Cited in the file of this patent

UNITED STATES PATENTS

| | | |
|---|---|---|
| 1,519,417 | Payne | Dec. 16, 1924 |
| 1,622,261 | Payne | Mar. 22, 1927 |
| 1,756,907 | Payne | Apr. 29, 1930 |
| 2,267,114 | Lear et al. | Dec. 23, 1941 |
| 2,315,298 | Thompson | Mar. 30, 1943 |
| 2,421,757 | Oetzel | June 10, 1947 |
| 2,606,638 | Russell | Aug. 12, 1952 |
| 2,738,044 | Winther | Mar. 13, 1956 |
| 2,739,683 | Gamundi | Mar. 27, 1956 |
| 2,876,880 | Cunningham | Mar. 10, 1959 |
| 2,880,595 | McGuffey et al. | Apr. 7, 1959 |
| 2,914,156 | Harting | Nov. 24, 1959 |

UNITED STATES PATENT OFFICE
CERTIFICATION OF CORRECTION

Patent No. 3,036,679            May 29, 1962

Alfred F. Millington et al.

It is hereby certified that error appears in the above numbered patent requiring correction and that the said Letters Patent should read as corrected below.

In the grant, lines 2 to 4, for "assignors to Novi Equipment Company, of Novi, Michigan, a corporation of Michigan," read -- assignors, by mesne assignments, to Lewis W. Welch, trustee,"; line 13, for "Novi Equipment Company, its successors" read -- Lewis W. Welch, as trustee, his successors --; in the heading to the printed specificati lines 4 and 5, for "assignors to Novi Equipment Company, Novi, Mich., a corporation of Michigan" read -- assignors, by mesne assignments, to Lewis W. Welch, ·trustee --.

Signed and sealed this 6th day of November 1962.

(SEAL)
Attest:

ERNEST W. SWIDER            DAVID L. LADD
Attesting Officer            Commissioner of Patents